(12) United States Patent
Watanabe et al.

(10) Patent No.: US 6,876,851 B2
(45) Date of Patent: Apr. 5, 2005

(54) METHOD AND SYSTEM FOR RADIO WAVE PROPAGATION CHARACTERISTICS ESTIMATION AND RAY SPATIAL RESOLUTION CONTROL

(75) Inventors: Yoshinori Watanabe, Tokyo (JP); Hiroshi Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 426 days.

(21) Appl. No.: 10/041,575

(22) Filed: Jan. 10, 2002

(65) Prior Publication Data

US 2002/0094809 A1 Jul. 18, 2002

(30) Foreign Application Priority Data

Jan. 17, 2001 (JP) .......................................... 2001-008368

(51) Int. Cl.$^7$ ............................................... H04Q 7/20
(52) U.S. Cl. .................. 455/423; 455/67.16; 455/67.14
(58) Field of Search ........................... 455/115.1–115.4, 455/226.1–226.4, 67.11, 67.12, 67.13, 67.14, 67.16–67.17, 423–425

(56) References Cited

PUBLICATIONS

S.Y. Seidel et al., "Site–Specific Propagation Prediction for Wireless In–Building Personal Communication System Design", IEEE Transactions on Vehicular Technology, vol. 43, No. 4, (Nov. 1994), pp. 878–891 with Abstract.

S. Fortune, "Efficient Algorithms for Prediction of Indoor Radio Propagation", in Proceeding of the 48$^{th}$ IEEE Vehicular Technology Conference, (May 1998), 572–576 with Abstract.

*Primary Examiner*—Duc Nguyen
(74) *Attorney, Agent, or Firm*—Sughrue Mion, LLP

(57) ABSTRACT

To shorten a required estimation time while keeping an estimation precision in an object environment given for estimating propagation characteristics with a ray launching method. In the case where a ray is propagated within a given observation area, and collides with a barrier residing on its path, a space in the vicinity of the ray is divided into a plurality of partial spaces until a predetermined condition is satisfied. The space in the vicinity of the ray that is considered to cause a degradation in the estimation precision is divided in reflection until there is less influence of degradation, whereby each of the subdivided partial spaces can be handled individually, so that the estimation precision of radio wave propagation characteristics can be made better than a conventional method. On the other hand, in the case where there is possibly less influence of degradation in the estimation precision, the space is not divided, whereby if a ray is radiated from a transmitting antenna coarsely, the total number of rays is reduced below that of the conventional method, so that a total calculation time taken for a propagation estimation can be shortened.

23 Claims, 17 Drawing Sheets

METHOD AND SYSTEM FOR RADIO WAVE PROPAGATION CHARACTERISTICS ESTIMATION AND RAY SPATIAL RESOLUTION CONTROL

BACKGROUND OF THE INVENTION

1. Field of the Invention

The present invention relates to a method and a system for a radio wave propagation characteristics estimation and a ray spatial resolution control, and in particular to a radio wave propagation characteristics estimation method, and a ray spatial resolution control method in predicting the radio wave propagation characteristics by a technique of geometrical optics.

2. Description of the Prior Art

A radio wave propagation simulator is employed to assist the arrangement of a base station or a host system in a radio communication system. The received power or delay spreading at any receiving point can be estimated by using the radio wave propagation simulator. On the basis of this estimation, an installation site of an effective transmitting station is determined, so that the overall efficiency can be enhanced by reducing the number of base stations to be arranged.

The radio wave propagation simulation is largely classified into a statistical technique and a deterministic technique. The statistical technique employs an expression for estimating the propagation loss with the arguments of distance and frequency, in which the parameters in the estimation expression are determined on the basis of a large amount of data resulted from actual measurements of the propagation loss in accordance with the statistical technique including the multivariate analysis. On the other hand, the deterministic technique is one in which the radio wave radiated from an antenna is regarded as an a gathering of a number of radio wave rays and each ray is reflected and transmitted repeatedly on the geometrical optics, and propagated. The propagation loss and the amount of delay at an observation point can be obtained by synthesizing the electric power and the propagation time of the rays incoming to the observation point.

The deterministic technique is further largely classified into an imaging technique and a ray launching technique, depending on a way of keeping track of the propagation path. The imaging technique determines a reflection and transmission path of the ray connecting between the transmitting and receiving points by obtaining an imaging point against the reflection surface. Since the reflection and transmission path is uniquely determined if the transmitting and receiving points and the reflecting and transmitting barriers are decided, the imaging technique can search a strict propagation route of the ray.

On the other hand, the ray launching technique is one in which the rays from the antenna are radiated at discrete angular intervals, irrespective of the position of the receiving point, and the ray passing near the receiving point through the repeated reflection and transmission is regarded as the ray incoming to the receiving point. The ray launching technique solves approximately, but not strictly like the imaging technique, the propagation route of the ray connecting between the transmitting and receiving points, and has a feature of shortening the time needed to search for the propagation route.

With the launching technique, first of all, a closed area is obtained around the transmitting antenna, and divided into the partial spaces. Then, one ray is allotted to each partial space, whereby the partial space and allotted ray are regarded as identical. Thereafter, the propagation routes for a finite number of rays radiated from the transmitting antenna are tracked, and on the basis of its result, a situation of radio wave propagation is estimated in an entire space around the antenna.

One example of dividing the closed area around the antenna into partial spaces was described in a literature written by Scott Y. Seidel, et al: "Site-Specific Propagation Prediction for Wireless In-Building Personal Communication System Design", IEEE TRANSACTIONS VEHICULAR TECHNOLOGY, VOL. 43, NO. 4, NOVEMBER 1994, pp. 878–891.

In this literature, first of all, a three dimensional closed area of a regular icosahedron is provided around a transmitting antenna 301, as shown in FIG. 12. Next, a face making up the regular icosahedron, namely, a plane of an equilateral triangle composed of the vertexes 406, 407 and 408 is extracted, and each side is divided into equal two lengths, using the points 409, 410 and 411, as shown in FIG. 13. By drawing the line segments parallel to the sides of the equilateral triangle having the vertexes 406, 407 and 408 and passing at the division points, a similar triangle for the original triangle is newly created internally. The above processing is performed for all the faces constituting the regular icosahedron of FIG. 12. Then, the vertexes of each equilateral triangle are moved in the direction of connecting the center of gravity in the regular icosahedron and the vertexes of each equilateral triangle newly created, so that there is an equal distance from the center of gravity, as shown in FIG. 14, for example.

FIG. 14 is a view showing an instance where one side of the equilateral triangle making up each face of the regular icosahedron of FIG. 12 is bisected. Rays radiated from a transmitting antenna 501 located at the center of gravity in the original regular icosahedron are radiated in each directions of connecting the transmitting antenna 501 and the vertexes of the polyhedrons of FIG. 14. In FIG. 14, as one example, a ray 504 passing at a vertex 502 is shown. At this time, a partial space 503 defined from the polygon of FIG. 14 and the transmitting antenna 501 is regarded as identical to the ray 504.

FIG. 15 is a view showing a partial space 605 regarded as identical to a ray 601. At a point 602, the area of a section 603 perpendicular to the ray 601 is defined hereinafter as a spatial resolution at the point 602. The spatial resolution at the point 602 is increased when the length between a transmitting antenna 604 and the point 602, namely, the propagation distance of the ray is greater. In this manner, a wide space is regarded as identical to one ray, whereby the radio wave propagation estimation precision by the ray launching thecnique is decreased with larger propagation distance.

Thus, in order to maintain the spatial resolution at a certain value or below at any time, irrespective of the propagation distance, a method of dividing the ray propagating per a predetermined distance was proposed. One example of this method was described in a literature written by Steven Fortune: "EFFICIENT ALGORITHMS FOR PREDICTION OF INDOOR RADIO PROPAGATION", in Proceedings of the 48th IEEE Vehicular Technology Conference, May, 1998, pp. 572–576. FIG. 16 is a view for explaining the method as described in the above literature.

A triangular cone 712 of FIG. 16 is devided into a triangular cones 708 to 711, if the propagation distance of an allotted ray 702 from a transmitting antenna 701 reaches a predetermined value. The rays 704 to 707 are allotted to the divided triangular cones, whereby the same processing is repeated subsequently. As a result, the spatial resolution can be kept at a certain value or below at any time, irrespective of the propagation distance.

FIG. 17 is a view for explaining the operation of the ray launching technique in the case where an observation area 017, a transmitting point 015, a receiving point 016, and two objects 001 and 002 within the observation area are provided. In FIG. 17, for the simplicity, the operation is explained only in the two dimensional plane, but it is common that the operation is performed in the three dimensional space.

A ray radiated in a direction along a propagation route 003 at a discrete interval is incident upon the object 001 at a point 018, so that a reflected ray 005 and a transmitting ray 004 are produced. The reflected ray 005 is further incident upon an object 002 at a point 019, so that a reflected ray 006 and a transmitting ray 007 are produced. Since the produced ray 006 passes by the receiving point 016, the ray 006 is regarded as incoming to the receiving point, a path consisting of the paths 003, 005 and 006 is regarded as one of the propagation routes connecting between the transmitting point 015 and the receiving point 016.

Specifically, the receiving power and the incoming delay time acquired from the propagation routes 003, 005 and 006 are recorded in FIG. 18. In FIG. 18, the transverse axis 103 represents the delay time required for the ray to proceed from the transmitting point 015 via the routes 003, 005 and 006 to the receiving point 016, and the longitudinal axis 102 represents the power strength of the ray having passed through the above route. For the transmitting rays 004 and 007, the transmission and reflection are repeatedly searched in the same manner as in the propagation routes 003, 005 and 006. The ray that passes by the receiving point 016 is treated as the incoming ray, as in the propagation route 006, and the above processing is continued till the search end condition is met.

The search end condition occurs when the received field strength at the reflection and transmission point falls below a predetermined value, or the total number of reflection and transmission reaches a predetermined number of times. After the ray radiated from the transmitting point 015 in the direction toward the propagation route 003 is searched for the reflection and transmission routes, the rays radiated in other radiation directions such as the rays 008 to 014 are also searched for the reflection and transmission routes. The rays are radiated in all the directions as defined in advance, and searched for the propagation routes, whereby a delay profile at the receiving point 016 can be obtained as shown in FIG. 19. In FIG. 19, the transverse axis 203 represents the time taken for the ray to go from the transmitting point 015 to the receiving point 016, and the longitudinal axis 202 represents the power strength of the ray having passed through the above route.

The received power at the receiving point 016 is given by a total of power strength for all the paths as indicated in FIG. 19, and the delay spreading indicating the distortion is given by the standard deviation of the delay time with a power ratio of the power strength to the received power in each delay time as the occurrence probability of the delay time.

Since the ray is regarded as identical to the partial space nearby the ray in the launching technique as described above, when the ray is reflected from a barrier, it is considered that the same reflection has occurred in the partial space in the vicinity of the ray. Therefore, from a viewpoint of the estimation precision, it is desirable that the spatial resolution at the reflection point is set not to be too larger than the area of the barrier. However, to improve the estimation precision, if the upper limit value of the entire spatial resolution is set at the minimum value of spatial resolution required when reflecting the ray from the barrier, there is a problem that the calculation time taken for the radio wave propagation estimation is increased. The reason is that if the spatial resolution is reduced, a greater total number of rays are radiated and the total time for searching the route is increased.

On one hand, if the upper limit value of spatial resolution is set to be relatively large to suppress the calculation time required for estimation, there is a problem that the overall estimation precision may be degraded. The reason is that when the ray is reflected from the barrier with a small spatial resolution, it is considered that the reflection also occurs even in the ray near area where the reflection does not actually occur.

BRIEF SUMMARY OF THE INVENTION

It is an object of the present invention to provide a method of shortening a required estimation time while preventing the degradation in the estimation precision, when an object environment for the propagation estimation is given in the ray launching technique.

According to one aspect of the present invention, there is provided a radio wave propagation characteristics estimation method of estimating the radio wave propagation characteristics by detecting a shield shielding a ray (radio wave) among a plurality of objects, wherein the plurality of objects are provided in an observation area as defined in a three dimensional space, and the ray is radiated over the observation area, wherein a closed space confining the ray in a scene of the ray colliding with the shield is divided into a plurality of partial spaces, and a new ray confined by each of the plurality of partial spaces is generated.

Also, according to another aspect of the invention, there is provided a ray spatial resolution control method for use in estimating the radio wave propagation characteristics to adjust the spatial resolution of a ray (radio wave) in accordance with a certain criterion, when the ray collides with a shield shielding the ray among a plurality of objects, wherein the plurality of objects are provided in an observation area as defined in a three dimensional space, the ray is radiated over the observation area, and a space regarded as identical to the ray is provided in the vicinity of the ray, comprising a first step of detecting a collision point of the ray with the shield, a second step of determining whether or not to divide the space regarded as identical to the ray in accordance with the certain criterion, a third step of dividing the space regarded as identical to the ray into a plurality of partial spaces if it is determined at the second step that the space regarded as identical to the ray is divided, and a fourth step of allotting a ray regarded as identical to each of the partial spaces divided at the third step.

And the number of divisions at the third step is set to M (M is an integer of 2 or greater), and after the ray is allotted to the i-th (i is a number from 1 to M) partial space at the fourth step, the first to fourth steps are executed for each of the allotted rays, whereby the first to fourth steps are repeated successively until it is determined that the space regarded as identical to the ray is not divided at the second step.

Also, the criterion at the second step consists of a first criterion for examining whether or not the field strength at a collision point of the ray with the shield is greater than or equal to a predetermined value, and a second criterion for examining whether or not an area ratio of a collided face of the shield to a cross section of the space in the vicinity of the ray taken by a plane containing the collided face of the shield is smaller than or equal to a predetermined value. Further, the criterion at the second step further comprises a third criterion for examining whether or not the area of the cross section is greater than or equal to a predetermined value, and the angle (incident angle) of the ray with the normal to the collided face is greater than or equal to a predetermined value.

Also, a conical form inscribed in a circular cone, and having a small error in volume from the circular cone is provided, with a central line of the conical form being a path of the ray, whereby the space in the vicinity of the ray is made up of the conical form, wherein in dividing the space in the vicinity of the ray into a plurality of partial spaces at the third step, employing a plurality of similar conical forms for the conical form making up the space in the vicinity of the ray, the plurality of similar conical forms are disposed in the vicinity of the ray, so that there may be a small error in the volume between the conical form making up the space in the vicinity of the ray and the sum of the plurality of similar conical forms for the conical form dividing the conical form.

Further, at the third step, a triangular cone is employed as the conical form inscribed in a circular cone, and the size of the similar triangular cones is set so that a plurality of similar equal triangular cones for the triangular cone can be disposed inside the triangular cone without interstice. Also, at the third step, a regular hexagonal cone is employed as the conical form inscribed in a circular cone, a similar regular hexagonal cone for the regular hexagonal cone is disposed at a center of the regular hexagonal cone, six regular hexagonal cones identical to the similar regular hexagonal cone are disposed on the side faces of the similar regular hexagonal cone, with one side face abutting with the other side face, and the size of the similar regular hexagonal cones is set so that an error in the volume between a total of seven similar regular hexagonal cones and the original regular hexagonal cone may be at minimum to dispose the similar regular hexagonal cones.

Still further, at the third step, a regular hexagonal cone is employed as the conical form inscribed in a circular cone, a similar regular hexagonal cone for the regular hexagonal cone is disposed at a center of the regular hexagonal cone, six regular hexagonal cones identical to the similar regular hexagonal cone are disposed on the side faces of the similar regular hexagonal cone, with one side face abutting with the other side face, and the size of the similar hexagonal cones is set so that the outermost contour side face of a conical form composed of a sum of seven similar regular hexagonal cones may be inscribed in the side face of the original regular hexagonal cone to dispose the similar hexagonal cones. Also, at the third step, a regular hexagonal cone is employed as the conical form inscribed in a circular cone, a similar regular hexagonal cone for the regular hexagonal cone is disposed at a center of the regular hexagonal cone, six regular hexagonal cones identical to the similar regular hexagonal cone are disposed on the side faces of the similar regular hexagonal cone, with one side face abutting with the other side face, and the size of the similar hexagonal cones is set so that the original regular hexagonal cone may be inscribed in the outermost contour side face of a conical form composed of a sum of seven similar regular hexagonal cones to dispose the similar hexagonal cones.

According to a further aspect of the invention, there is provided a radio wave propagation characteristics estimation system for estimating the radio wave propagation characteristics by detecting a shield shielding a ray (radio wave) among a plurality of objects, wherein the plurality of objects are provided in an observation area as defined in a three dimensional space, and the ray is radiated over the observation area, wherein a closed space confining the ray in a scene of the ray colliding with the shield is divided into a plurality of partial spaces, and a new ray confined by each of the plurality of partial spaces is generated.

Also, according to another aspect of the invention, there is provided a ray spatial resolution control system for use in estimating the radio wave propagation characteristics to adjust the spatial resolution of a ray (radio wave) in accordance with a certain criterion, when the ray collides with a shield shielding the ray among a plurality of objects, wherein the plurality of objects are provided in an observation area as defined in a three dimensional space, the ray is radiated over the observation area, and a space regarded as identical to the ray is provided in the vicinity of the ray, comprising collision point detecting means for detecting a collision point of the ray with the shield, determination means for determining whether or not to divide the space regarded as identical to the ray in accordance with the certain criterion, division means for dividing the space regarded as identical to the ray into a plurality of partial spaces if the determination means determines that the space regarded as identical to the ray is divided, and allotting means for allotting a ray regarded as identical to each of the partial spaces divided by the division means.

And the number of divisions by the division means is set to M (M is an integer of 2 or greater), and after the ray is allotted to the i-th (i is a number from 1 to M) partial space by the allotting means, the collision point detecting means, the determination means, the division means and the allotting means are executed for each of the allotted rays, whereby the collision point detecting means, the determination means, the division means and the allotting means are executed repeatedly and successively until the determination means determines that the space regarded as identical to the ray is not divided.

Also, the criterion in the determination means consists of a first criterion for examining whether or not the field strength at a collision point of the ray with the shield is greater than or equal to a predetermined value, and a second criterion for examining whether or not an area ratio of a collided face of the shield to a cross section of the space in the vicinity of the ray taken by a plane containing the collided face of the shield is smaller than or equal to a predetermined value. Further, the criterion in the determination means further comprises a third criterion for examining whether or not the area of the cross section is greater than or equal to a predetermined value, and the angle (incident angle) of the ray with the normal to the collided face is greater than or equal to a predetermined value.

Also, a conical form inscribed in a circular cone, and having a small error in volume from the circular cone is provided, with a central line of the conical form being a path of the ray, whereby the space in the vicinity of the ray is made up of the conical form, wherein when the division means divides the space in the vicinity of the ray into a plurality of partial spaces, employing a plurality of similar conical forms for the conical form making up the space in the vicinity of the ray, the plurality of similar conical forms are disposed in the vicinity of the ray, so that there may be a small error in the volume between the conical form making up the space in the vicinity of the ray and the sum of the plurality of similar conical forms for the conical form dividing the conical form.

Further, in the division means, a triangular cone is employed as the conical form inscribed in a circular cone, and the size of the similar triangular cones is set so that a plurality of similar equal triangular cones for the triangular cone can be disposed inside the triangular cone without interstice. Also, in the division means, a regular hexagonal cone is employed as the conical form inscribed in a circular cone, a similar regular hexagonal cone for the regular hexagonal cone is disposed at a center of the regular hexagonal cone, six regular hexagonal cones identical to the similar regular hexagonal cone are disposed on the side faces of the similar regular hexagonal cone, with one side face abutting with the other side face, and the size of the similar hexagonal cones is set so that an error in the volume between a total of seven similar regular hexagonal cones and the original regular hexagonal cone may be at minimum to dispose the similar hexagonal cones.

Also, in the division means, a regular hexagonal cone is employed as the conical form inscribed in a circular cone, a similar regular hexagonal cone for the regular hexagonal cone is disposed at a center of the regular hexagonal cone, six regular hexagonal cones identical to the similar regular hexagonal cone are disposed on the side faces of the similar regular hexagonal cone, with one side face abutting with the other side face, and the size of the similar hexagonal cones is set so that the outermost contour side face of a conical form composed of a sum of seven similar regular hexagonal cones may be inscribed in the side face of the original regular hexagonal cone to dispose the similar hexagonal cones. Further, in the division means, a regular hexagonal cone is employed as the conical form inscribed in a circular cone, a similar regular hexagonal cone for the regular hexagonal cone is disposed at a center of the regular hexagonal cone, six regular hexagonal cones identical to the similar regular hexagonal cone are disposed on the side faces of the similar regular hexagonal cone, with one side face abutting with the other side face, and the size of the similar hexagonal cones is set so that the original regular hexagonal cone maybe inscribed in the outermost contour side face of a conical form composed of a sum of seven similar regular hexagonal cones to dispose the similar hexagonal cones.

According to a further aspect of the invention, there is provided a program for enabling the computer to perform a radio wave propagation characteristics estimation method of estimating the radio wave propagation characteristics by detecting a shield shielding a ray (radio wave) among a plurality of objects, wherein the plurality of objects are provided in an observation area as defined in a three dimensional space, and the ray is radiated over the observation area, wherein a closed space confining the ray in a scene of the ray colliding with the shield is divided into a plurality of partial spaces, and a new ray confined by each of the plurality of partial spaces is generated.

Also, according to another aspect of the invention, there is provided a program for enabling the computer to perform a ray spatial resolution control method for use in estimating the radio wave propagation characteristics to adjust the spatial resolution of a ray (radio wave) in accordance with a certain criterion, when the ray collides with a shield shielding the ray among a plurality of objects, wherein the plurality of objects are provided in an observation area as defined in a three dimensional space, the ray is radiated over the observation area, and a space regarded as identical to the ray is provided in the vicinity of the ray, comprising a first step of detecting a collision point of the ray with the shield, a second step of determining whether or not to divide the space regarded as identical to the ray in accordance with the certain criterion, a third step of dividing the space regarded as identical to the ray into a plurality of partial spaces if it is determined at the second step that the space regarded as identical to the ray is divided, and a fourth step of allotting a ray regarded as identical to each of the partial spaces divided at the third step.

The operation of the invention will be set forth below. In the invention, when a ray is propagated within a given observation area, and collides with a barrier residing on its path, a space in the vicinity of the ray is divided into a plurality of partial spaces until a predetermined condition is satisfied. With the conventional method, the partial space was divided in accordance with the propagation distance, irrespective of the reflection. However, with the inventive method, the partial space that is considered to cause a degradation in the estimation precision if dealt with uniformly is divided until there is less influence of degradation, whereby each of the subdivided partial spaces can be handled individually. Employing this inventive method, the estimation precision of radio wave propagation characteristics can be made better than the conventional method. On the other hand, in the case where there is possibly less influence of degradation in the estimation precision, the partial space is not divided, whereby if the initial value of spatial resolution is set to be relatively large, the total number of rays is reduced as compared with the conventional method in which the spatial resolution is evenly set at a small value to increase the estimation precision, so that the total calculation time taken for the propagation estimation can be shortened.

Because of the above features, in the invention, the spatial resolution can be controlled adaptively in accordance with the given estimation area. Accordingly, the estimation precision can be increased and the calculation time shortened as compared with the conventional method.

DETAILED DESCRIPTION OF THE PREFERRED EMBODIMENTS

Figure 1:
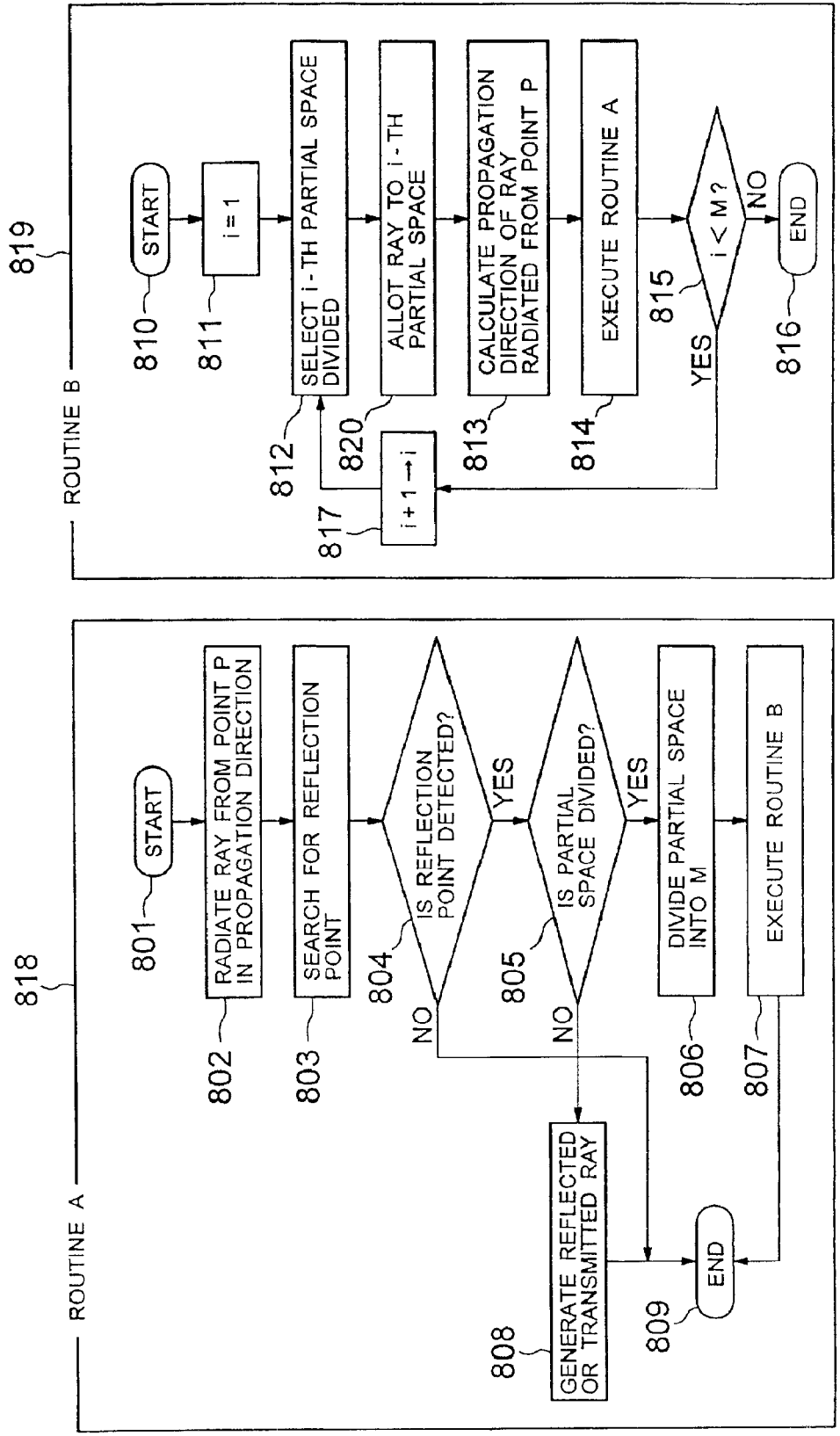
FIG. 1 is a flowchart showing an operation of an embodiment according to the present invention.

The preferred embodiments of the present invention will be described below by reference to the accompanying drawings. FIG. 1 is a flowchart showing an operation of an embodiment of the present invention, in which two routines A and B (818 and 819) are provided. In FIG. 1, it is supposed that an observation area is given in a three dimensional space, the objects such as walls and fixtures are provided within the observation area, and a ray is radiated from a point P within the observation area in the propagation direction (step 802), and a flow up to generating the reflected and transmitted rays at a reflection point is shown.

Figure 14:
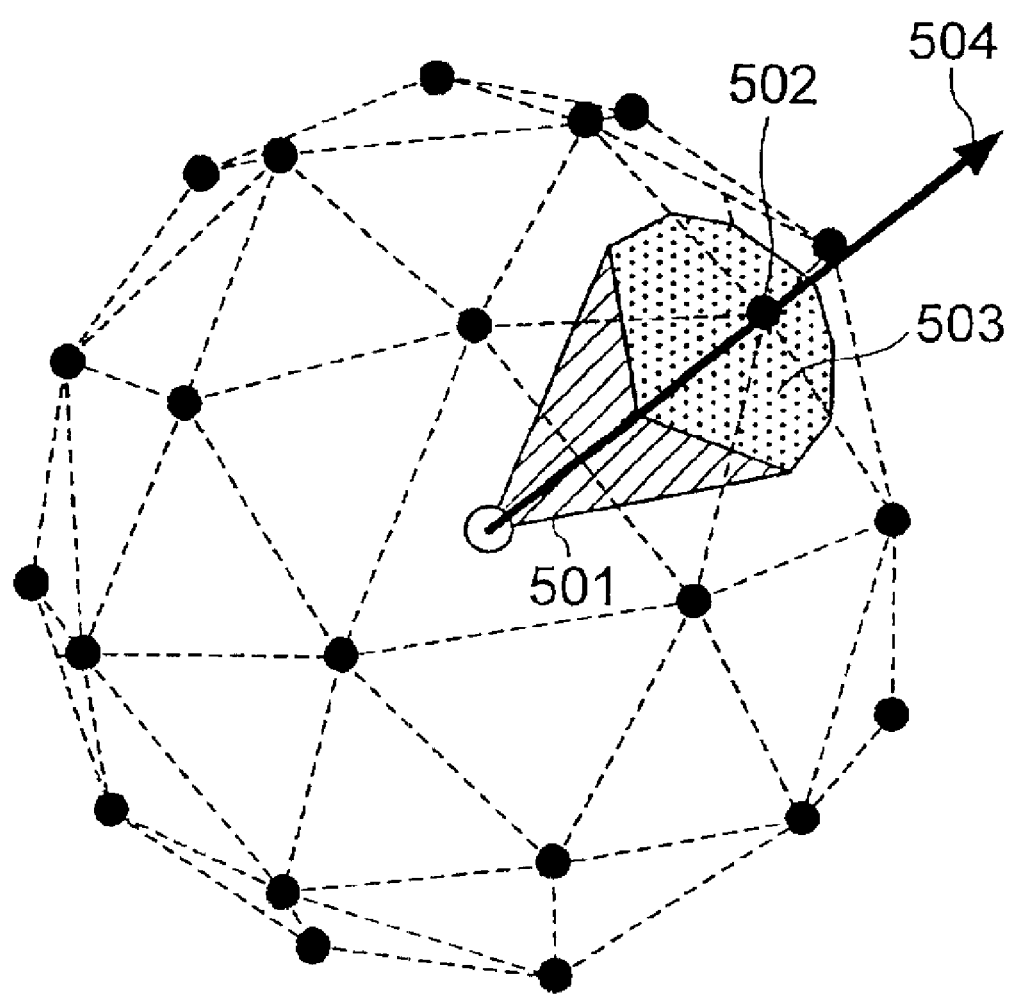
FIG. 14 is a view for explaining a radiation of a ray at a discrete interval.
Figure 15:
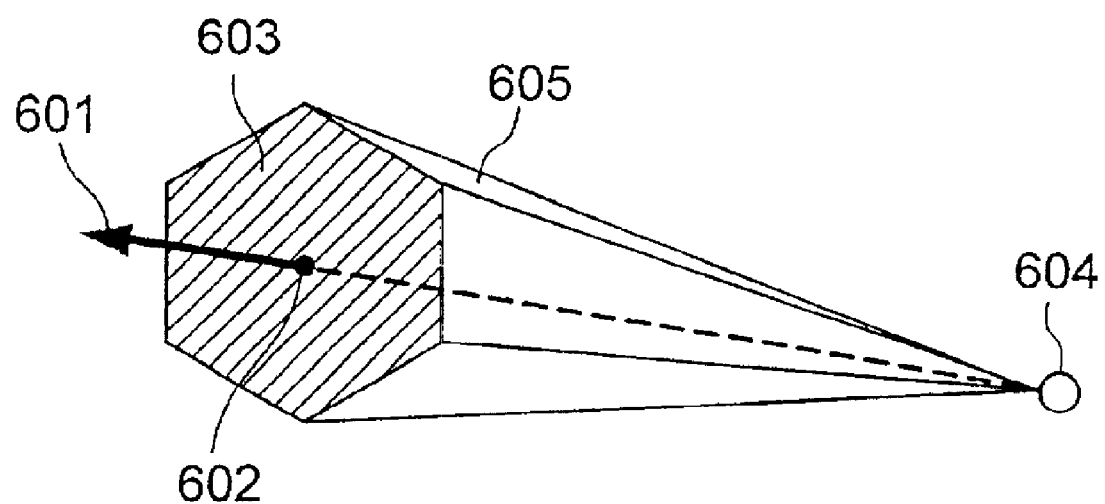
FIG. 15 is a view showing an example of the ray and the partial space.
Figure 16:
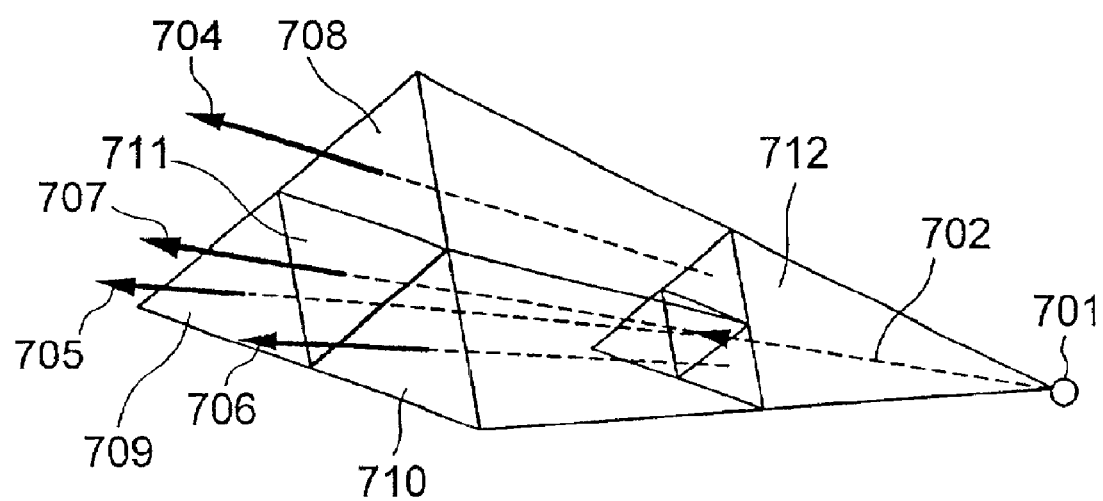
FIG. 16 is a view for explaining how to divide the partial space by the conventional method.
Figure 17:
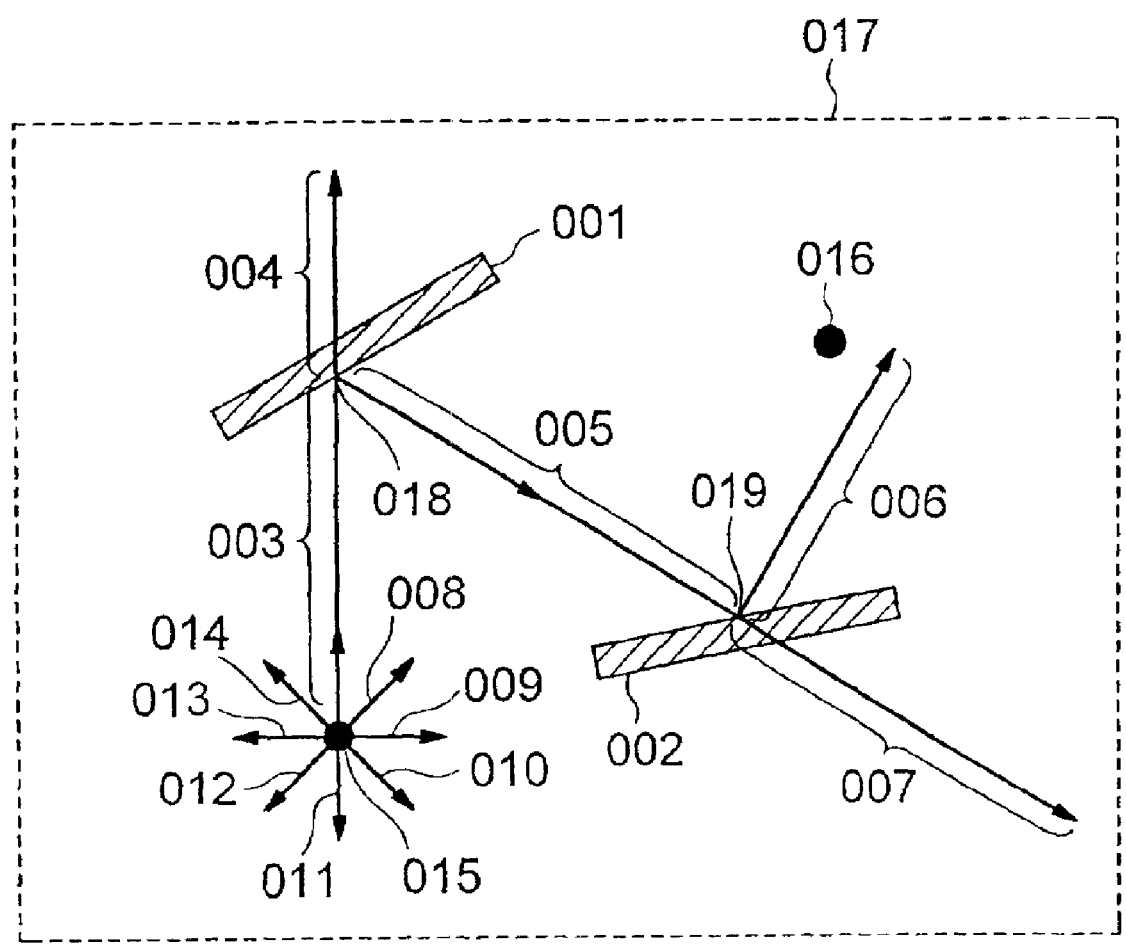
FIG. 17 is an explanatory view of a ray launching technique.
Figure 18:
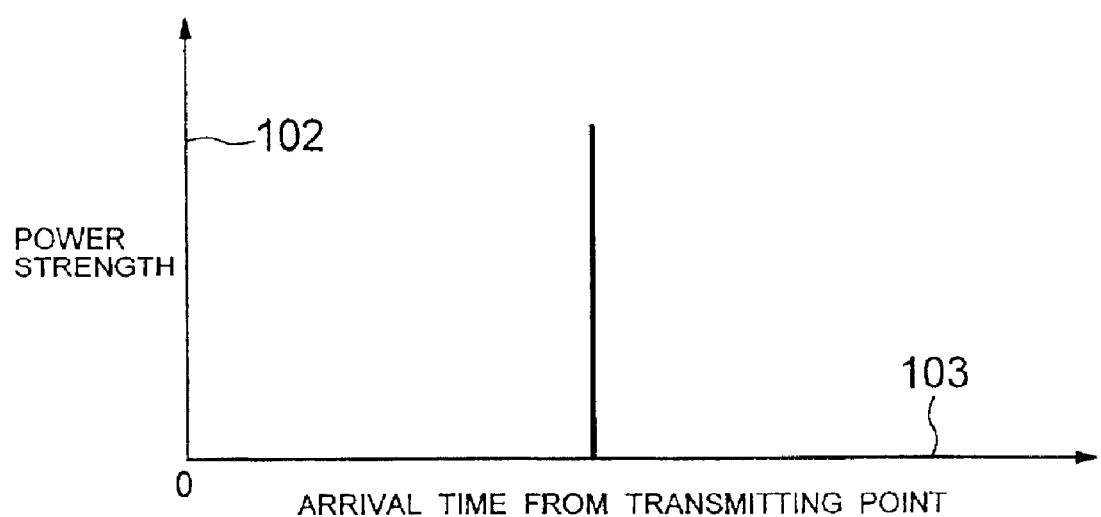
FIG. 18 is a graph showing an example of a path profile of one ray at an observation point.
Figure 19:
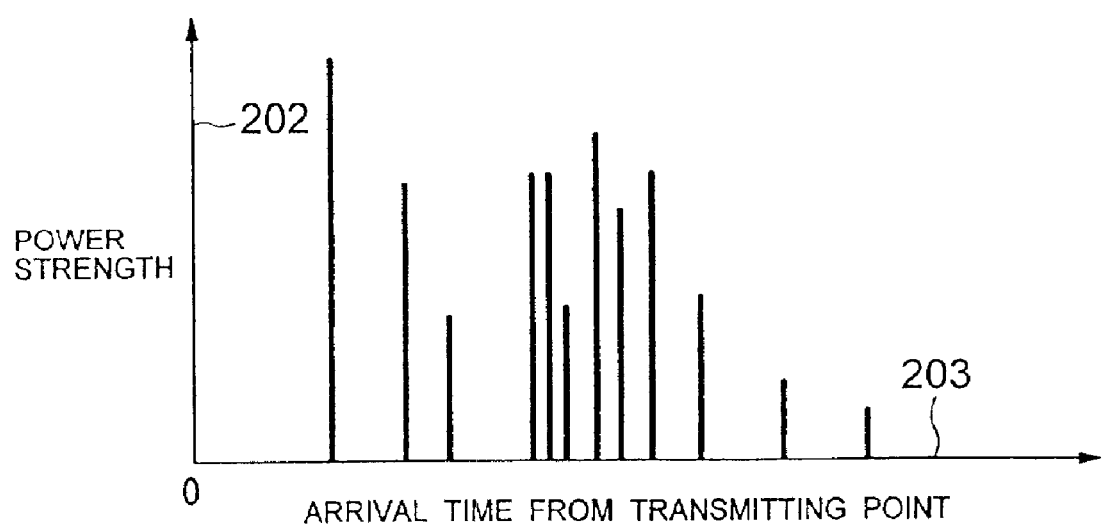
FIG. 19 is a graph showing an example of the path profiles of rays at the observation point obtained by the ray launching technique.

Herein, point P indicates the reflected or transmitted point in the ray launching technique or the position of a transmitting antenna, and specifically point 018, point 019, and transmitting antenna 015 in FIG. 17 that are cited in the description of related art. Also, when the point P is the transmitting antenna, the propagation direction indicates the discrete radiating direction provided around the transmitting antenna, and specifically directions 003, 008 to 014 in FIG. 17 as described in the description of related art, or a direction connecting the transmitting antenna 501 of FIG. 14 with each vertex of the polyhedron, for example, a direction of ray 504. On one hand, when the point P is the reflection or transmission point, the propagation direction indicates the direction of reflected ray or transmitted ray, and specifically the propagation routes 003 to 007 in FIG. 17.

First of all, a point at which a ray radiated from the point P in the propagation direction collides with an object within the observation area, namely, a reflection point, is searched and detected (steps 803, 804). Then, a determination whether or not a partial space regarded as identical to the ray incident upon the reflection point is subdivided into smaller partial spaces is made on the basis of a predefined criterion (hereinafter described) (step 805).

If the partial space is subdivided into smaller partial spaces, the partial space is subdivided into M (M is an integer) partial spaces in accordance with a predefined method (hereinafter described) (step 806), and the procedure transfers to routine B (819) (step 807). If the partial space is not subdivided, the reflected ray and the transmitted ray are generated at the reflection point, and the procedure is ended (steps 808, 809). Also, if the reflection point is not detected at step 804, the procedure is ended.

In routine B (819), an internal variable i (i=1 to M) is first defined, and i is set to 1 as an initial value (step 811). Then, of the M partial spaces subdivided at step 806 in routine A (818), the i-th partial space is selected (step 812). And a ray is allotted to the i-th partial space selected (step 820), and the propagation direction of the ray is calculated in accordance with the predefined method (hereinafter described) (step 813).

Herein, supposing that the ray allotted at step 820 to the partial spaces subdivided at step 806 is radiated from a starting point P in the propagation direction obtained at step 813, the procedure transfers to routine A again (818). In routine A (818), it is determined whether or not the divided partial spaces are further subdivided, and if so, the subdivision processing is performed at step 805 again, and then the procedure transfers to routine B (819). If the subdivision is not performed, the reflected ray and the transmitted ray are generated (step 808), and the procedure is ended (step 809).

At step 814, the procedure transfers to routine A (818), and if routine A (818) is ended at step 809, the procedure transfers to step 815 immediately after that. At step 815, it is determined whether or not the value of the internal variable i is smaller than M. If it is smaller than M, i is incremented by 1 (step 817), and other partial space is selected (step 812). If the value of i is greater than or equal to M, routine B (819) is ended (step 816).

At step 807, the procedure transfers to routine B (819). If routine B (819) is ended at step 816, the procedure transfers to step 809 immediately after that, where one nested routine 818 is ended. The above processing is performed until it is unnecessary to subdivide the partial space at step 806.

Figure 2:
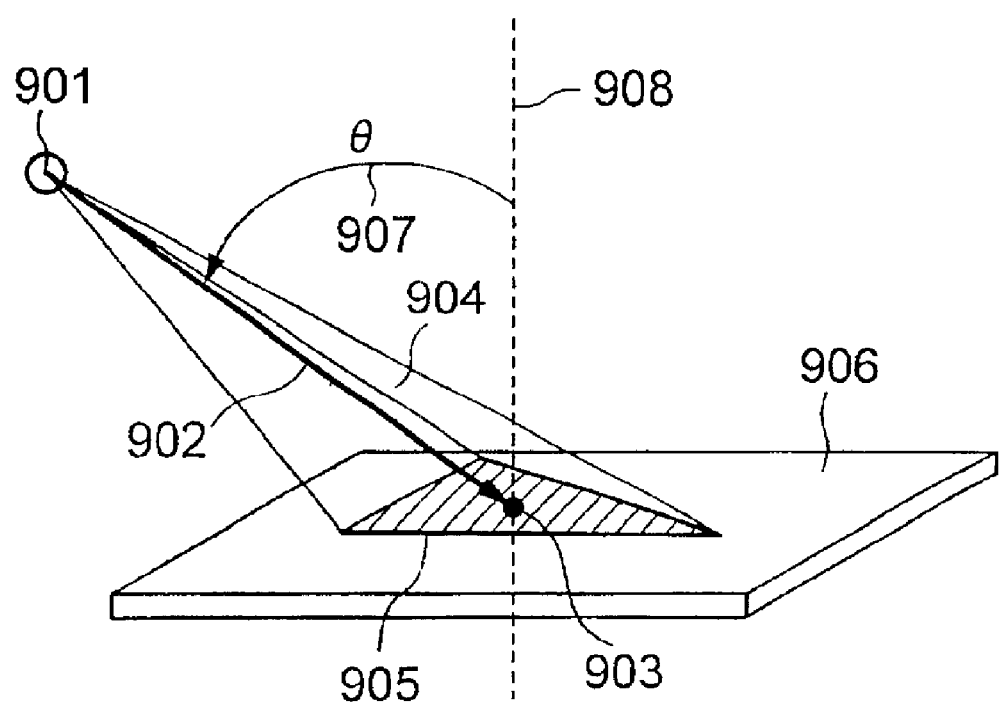
FIG. 2 is a view for explaining a process of generating an intersectional plane between a partial space and a barrier.

Referring now to FIGS. 2 to 5, a specific operation of an embodiment of the invention as shown in FIG. 1 will be described below. FIG. 2 is a view for explaining a process of generating an intersectional face between a partial space and a barrier. A ray 902 radiated from a point 901 collides with the barrier 906 at a point 903. A line 908 is the normal to the barrier 906, and an angle 907 indicates the incident angle of the ray 902 upon the barrier 906. At this time, the intersectional face 905 is generated by the partial space 904 near the ray 902 and the barrier 906. FIG. 2 shows an instance where a space around an antenna is divided by a triangular cone.

Figure 3:
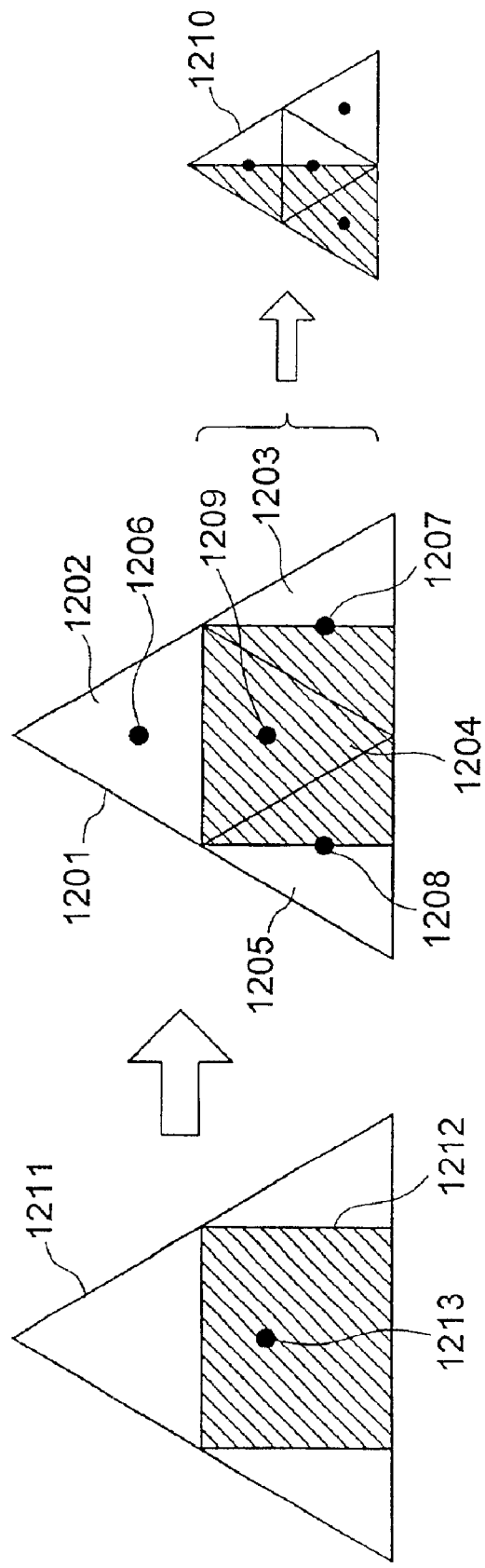
FIGS. 3(A) to 3(C) are views for explaining a subdivision of a partial space in this invention.

FIG. 3 is a view for explaining the subdivision of the partial space in this invention. Herein, an instance is shown where θ is equal to 0 in FIG. 2. FIG. 3A shows an intersectional face 1212 (slant line portion) that is generated by a barrier 1212 and a section 1211 of the partial space, as a result of the ray 902 being incident upon a point 1213. One example of the criterion (i.e., criterion at step 805 in the flowchart of FIG. 1) for determining whether or not the partial space 904 is subdivided at the point 903 is as follows:

(1) The electric field strength of the ray at the point 1213 is greater than or equal to a predetermined value.

(2) The area ratio of the intersectional face 1212 to the partial space section 1211 is smaller than or equal to a predetermined value.

(3) The area of the partial space section 1211 is greater than or equal to a predetermined value, and the incident angle 907 of the ray 902 is greater than or equal to a predetermined value.

Basically, if (1) and (2) of the above three items are satisfied at the same time, the partial space 904 is divided (subdivided). In addition to these two criteria, the criterion (3) may be further added, whereby the partial space may be divided (subdivided) if three criteria are satisfied at the same time.

A method of deciding the propagation direction of the ray allotted to the subdivided partial space (i.e., method of calculating the direction at step 813 in the flowchart of FIG. 1) is made in the following manner. Firstly, the partial space is divided at any point on a line segment connecting the points 903 and 901 by a plane perpendicular to the ray 902. A section 1309 of the partial space of FIG. 4 resulting therefrom is divided into M (M=4 in this example) similar regions 1305 to 1308, and a center of gravity in each region is obtained, like the points 1301 to 1304. Also, the like center of gravity is obtained for another sectional face of the partial space. Connecting the confronted centers of gravity, a desired propagation vector 1901 is obtained as shown in FIG. 5.

Figure 4:
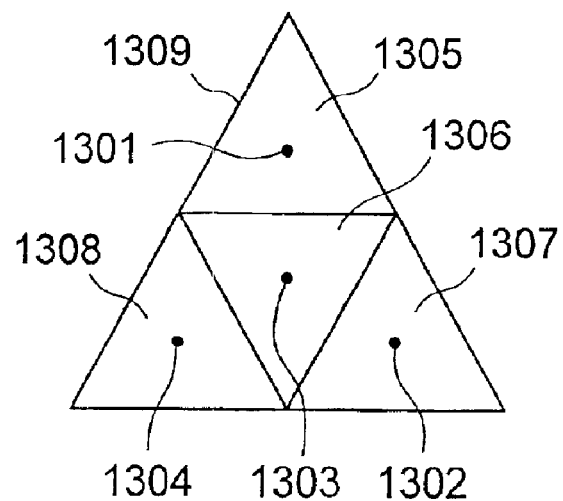
FIG. 4 is a cross-sectional view showing an example of dividing the partial space in a first embodiment of the invention.
Figure 5:
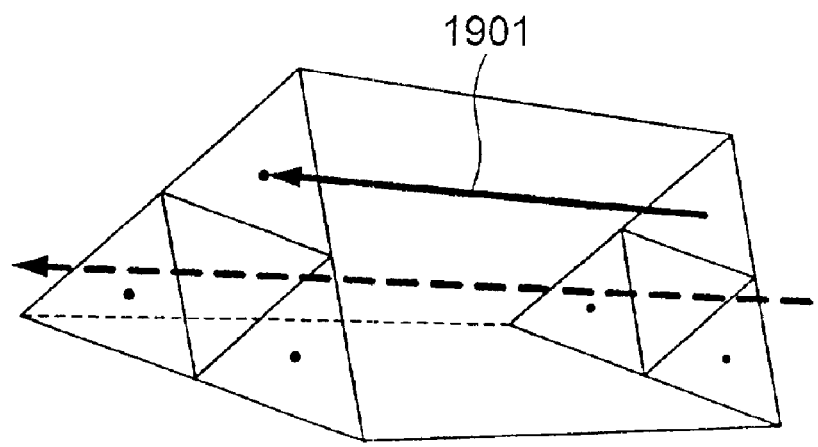
FIG. 5 is a view for explaining a process for obtaining a propagation direction of a ray allotted to the divided partial space.

FIGS. 3 to 5 show an instance where M is equal to 4, but an instance where M takes another value may be dealt with in the same way.

When the partial space 904 is subdivided in this manner, the cross section of the partial space at the reflection point 903 is shown in FIG. 3B. On the basis of the flowchart of FIG. 9 and the above criteria for division, the partial space 1202 is not divided anymore, and the ray allotted to the partial space 1202 is not reflected from the barrier 1212, but passes at the point 1206, and continues to proceed till it collides with other barrier. This partial space 1202 is not divided because no reflection point is detected at step 804 in the flowchart of FIG. 1. In particular, the ray allotted to the partial space 1202 passes at the point 1206 and is not reflected from the barrier 1212.

On one hand, the partial space 1203, which meets the above criterion, is extracted as shown in FIG. 3C, further subdivided, and then subdivided as needed in the same manner.

Figure 6:
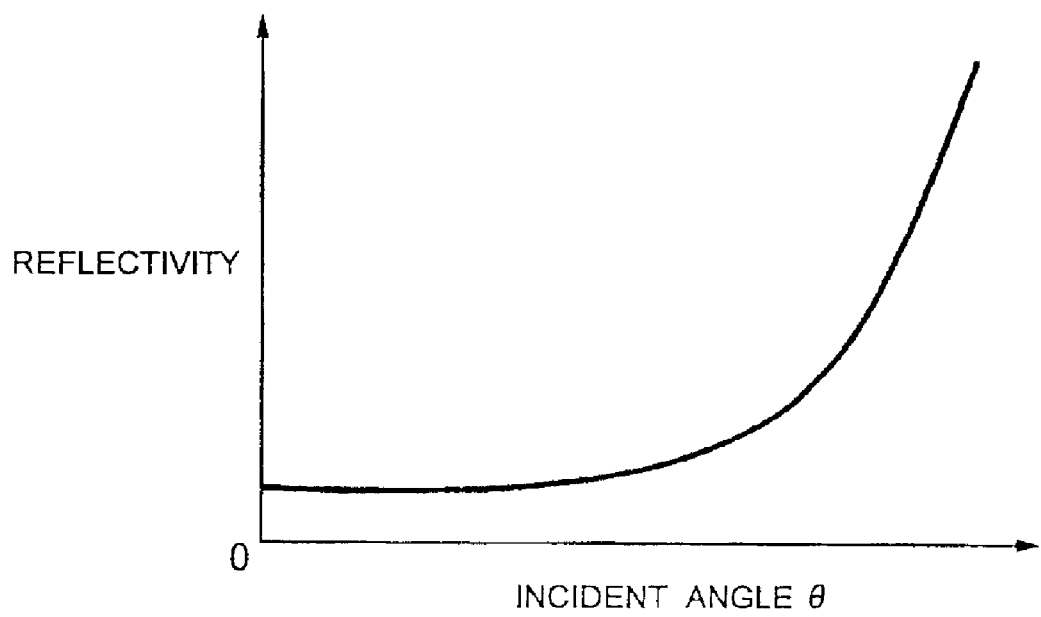
FIG. 6 is a view showing an example of an incident angle characteristic for the reflectivity.

The effects of this embodiment will be described below. In this embodiment, the area ratio of the intersectional face between the partial space and the barrier to the cross section of the partial space at the reflection point is used as the criterion for division, and the region where no reflection occurs in practice can be divided and handled in another way (criterion (2)). Though the reflectivity of radio wave is typically increased rapidly with greater incident angle, as shown in FIG. 6, the region where the ray is incident upon the barrier at different angle with greatly varied reflectivity can be divided and dealt with in another way by employing the criterion with the incident angle of the ray (criterion (3)).

The estimation precision of the ray launching technique can be enhanced due to the above effect. On the other hand, since the subdivided partial spaces are analogous to the original partial space, the same processing can be repeated in the subsequent subdivision process, thereby simplifying the process. Further, since the partial space before subdivision is given by the sum of subdivided partial spaces, the total space around the antenna can be estimated without interstice.

Figure 7:
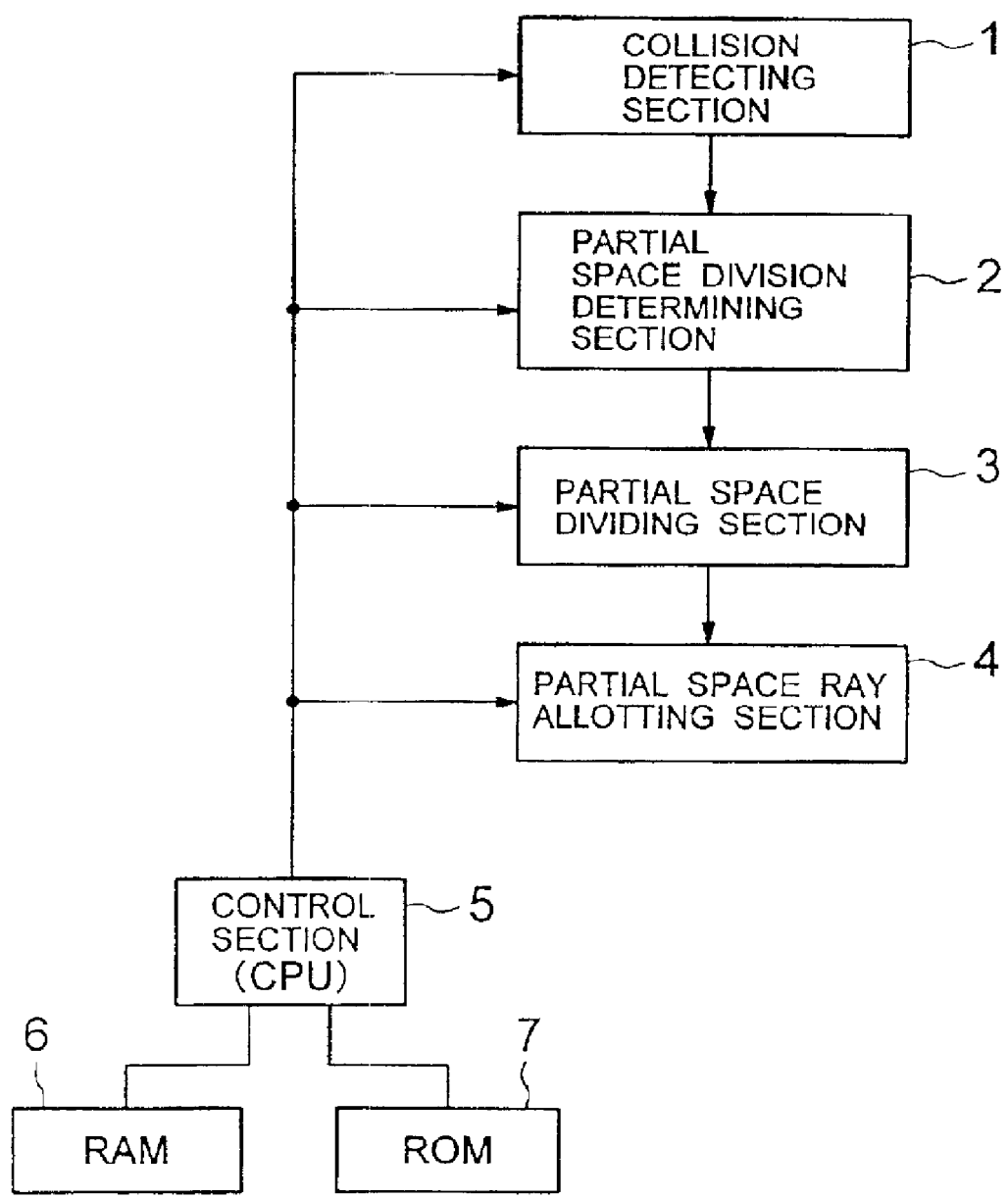
FIG. 7 is a diagram showing an example of a functional block of the invention.

From the processing operation as described above, a functional block for implementing this processing operation is obtained as shown in FIG. 7. Referring now to FIG. 7, the functional block is composed of a collision detection section 1, a partial space division determination section 2, a partial space division section 3, a partial space ray allotting section 4, a control section (CPU) 5, a RAM (Random Access Memory) 6, and a ROM (Read Only Memory) 7.

The collision detection section 1 has a function of detecting the collision of the ray with the shield (barrier). For instance, in FIG. 3, the ray collides with the barrier 1212, and the presence or absence of collision can be determined by solving simultaneously an expression as defined in the three dimensional space representing the face of the barrier 1212 and an expression as defined in the three dimensional space representing the ray.

The partial space determination section 2 has a function of determining whether or not the space regarded as identical to the ray is divided in accordance with the criterion. The partial space division section 3 has a function of dividing the space into a plurality of partial spaces in accordance with the above criterion. The partial space ray allotting section 4 has a function of allotting the ray regarded as identical to each of the divided partial spaces.

The control section 5 is the CPU (corresponding to the central processing unit of the computer), in which the control section 5 reads an operation control program stored in a storage medium of the ROM 7, and controls each of the sections 1 to 4 in accordance with a control procedure of this program, employing the RAM 6 that is a working memory to execute the operation processing as shown in FIG. 1. Namely, the program controls the operation of the CPU, and the CPU under the program control is instructed by the program to perform each processing as described above.

Figure 8:
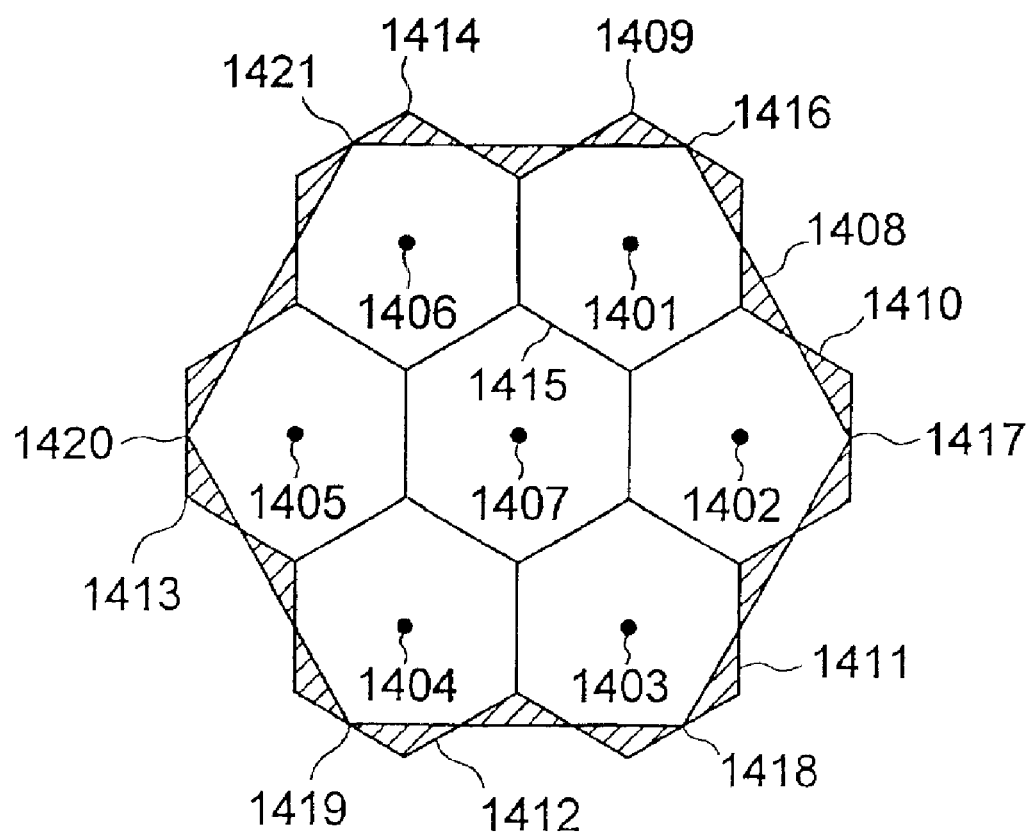
FIG. 8 is a cross-sectional view showing an example of dividing the partial space in a second embodiment of the invention.

A second embodiment of the invention will be described below by reference to the drawings. In the first embodiment, the space around the antenna is divided by the conical form so that the partial space is severed by a plane perpendicular to the ray as shown in FIG. 4. On the other hand, in the second embodiment, the space around the antenna is divided so that the partial space is severed as shown in FIG. 8. In FIG. 8, an instance of M=7 where the partial space is subdivided into similar regular hexagons 1409 to 1415 of a regular hexagon 1408 is shown. The regular hexagons 1409 to 1414 are contact with the vertexes of the regular hexagon 1408 at the middle points 1416 to 1421 of their sides, and after division, the ray allotted to the partial spaces pass through the centers of gravity 1401 to 1407 for the regular hexagons 1409 to 1415.

Figure 9:
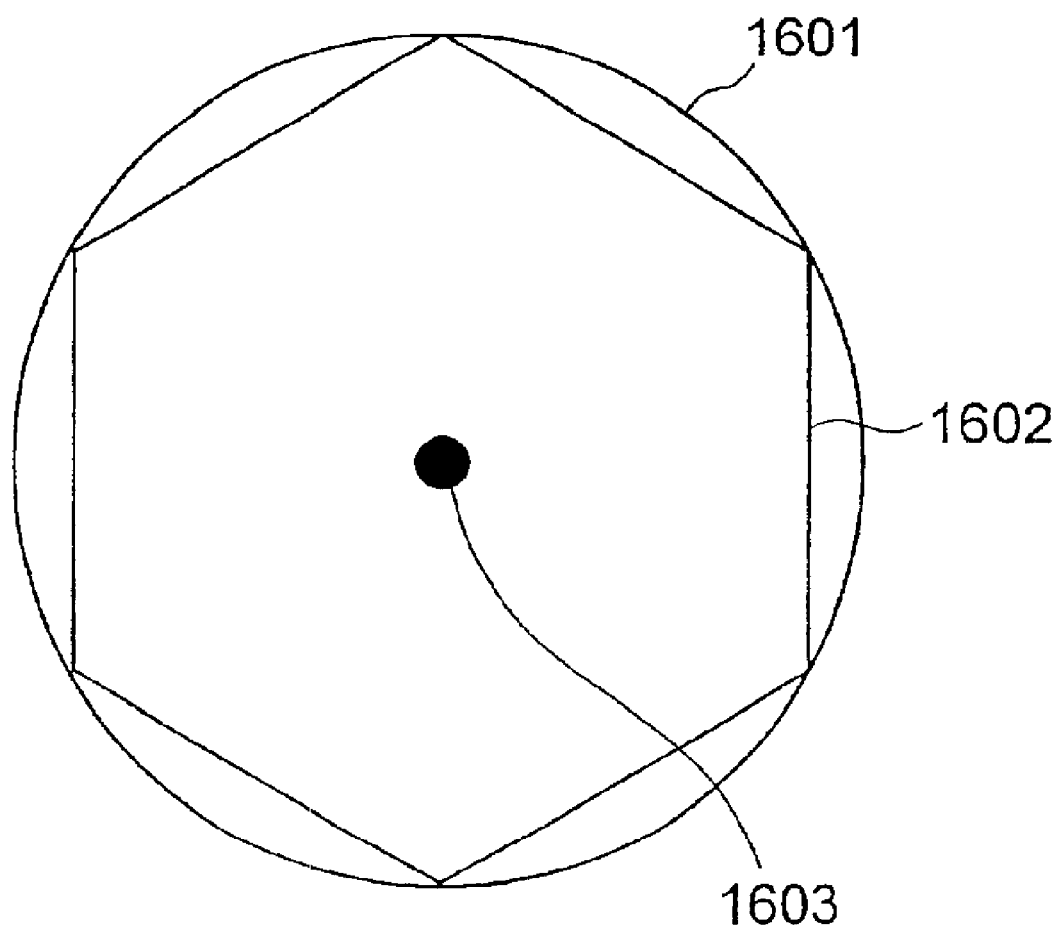
FIG. 9 is a view for explaining an approximation of partial space with a circular cone.

In the case where a relatively circular figure is employed like the regular hexagon used in this second embodiment, a determination whether or not the ray is taken in when the ray passes in the vicinity of the receiving antenna can be simplified, resulting in greater processing rate. The reason is that this determination is typically made by checking to see whether or not the receiving antenna is contained inside the partial space in the vicinity of the ray. Thus, if the partial space is approximated by a circumcircle 1601 of the regular hexagon 1602 that is a sectional plane perpendicular the ray, as shown in FIG. 9, this determination results in examining the distance between the receiving antenna and the ray, whereby the simplification of determination process can be accomplished.

Figure 10:
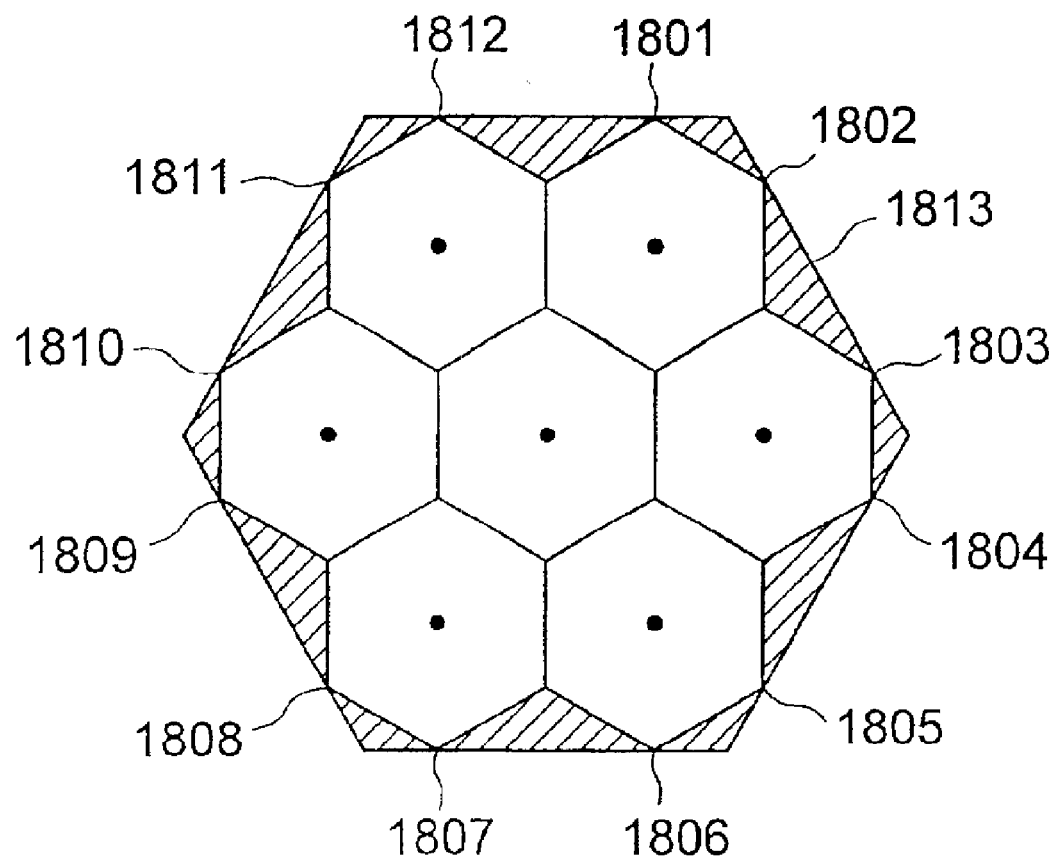
FIG. 10 is a cross-sectional view showing an example of dividing the partial space in a third embodiment of the invention.

Next, a third embodiment of the invention will be described below by reference to the drawings. In the case where the space around the antenna is divided to have the cross section of the partial space as shown in FIG. 8, comparing a cross section 1408 before division with a sum area of the partial spaces after division gives rise to excessive and deficient areas as indicated by the slant line in FIG. 8. Thus, a division form in which the partial space after division does not lap out of the partial space before division is shown in FIG. 10.

Figure 11:
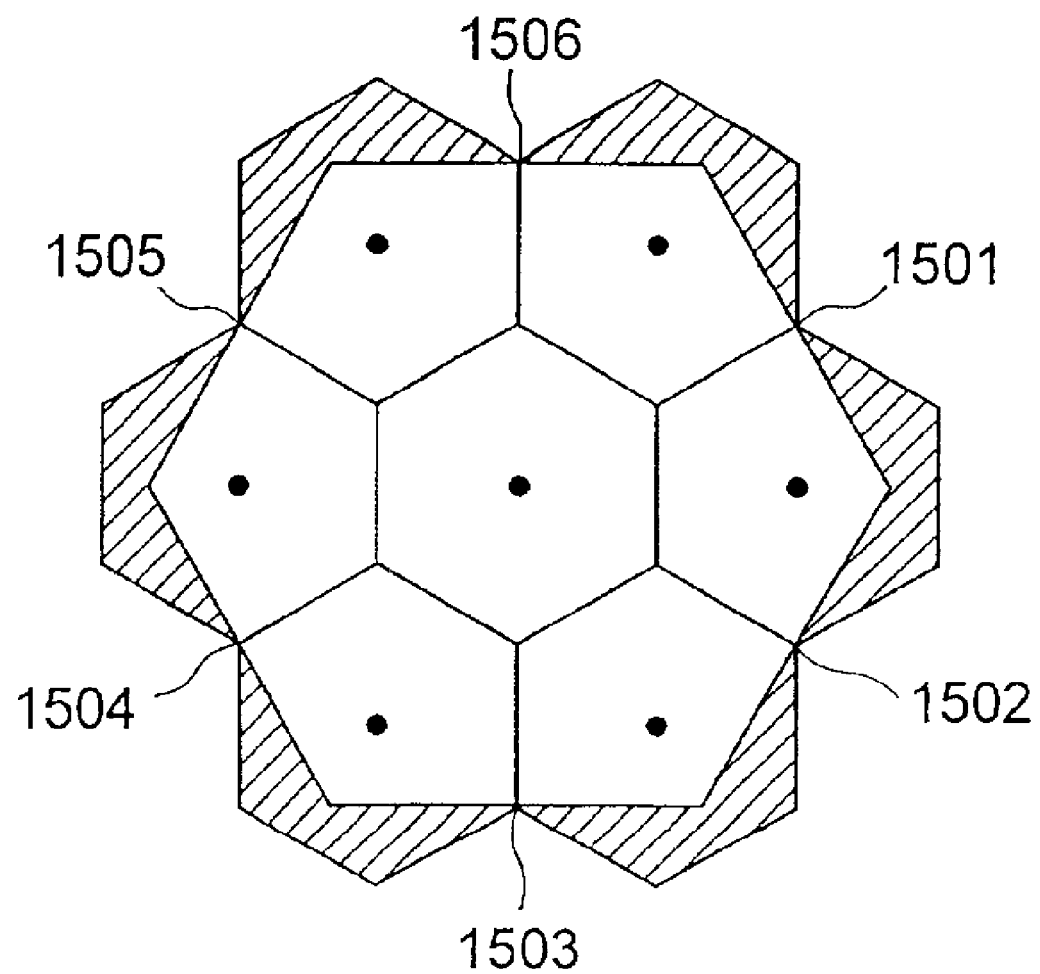
FIG. 11 is a cross-sectional view showing another example of dividing the partial space in the third embodiment of the invention.
Figure 12:
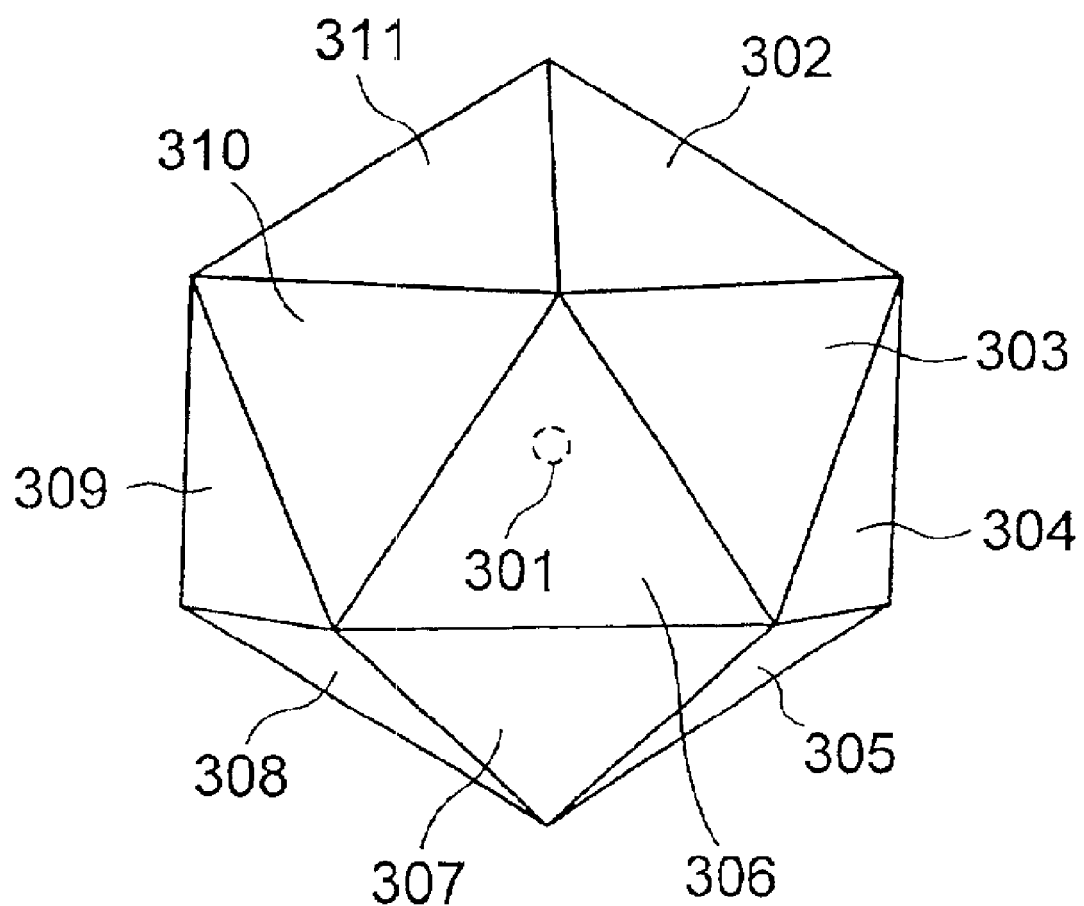
FIG. 12 is a view showing an example of a closed area around a transmitting antenna.
Figure 13:
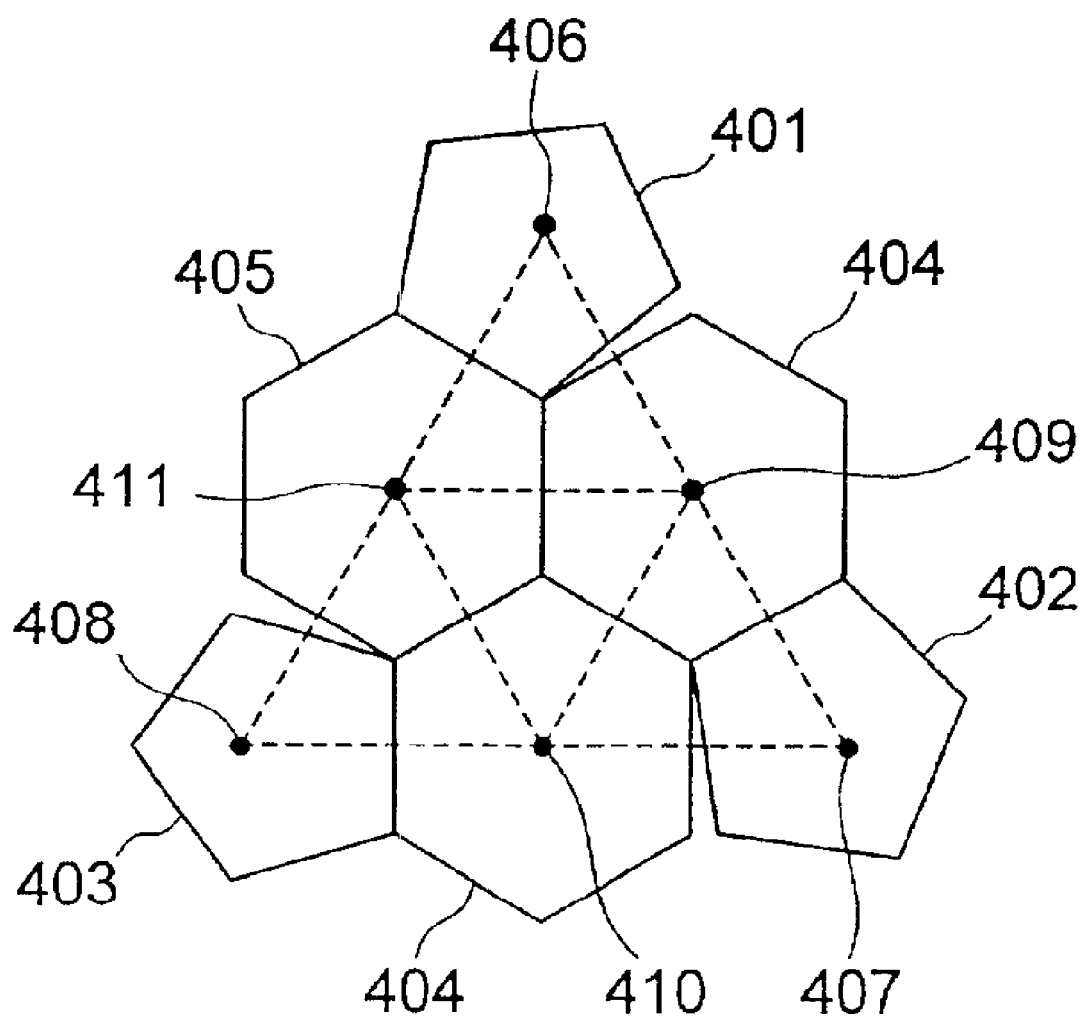
FIG. 13 is a view for explaining a process for dividing the closed area around the transmitting antenna.

On one hand, a division form in which there is no interstice between the partial space after division and the partial space before division is shown in FIG. 11. In FIG. 10, the size of regular hexagon after division is set up so that the vertexes 1801 to 1812 are inscribed in the regular hexagon 1813. On the other hand, in FIG. 11, the size of regular hexagon after division is set up so that the regular hexagon after division intersects at the middle points 1501 to 1506 of the sides for the regular hexagon before division.

In particular, when the division form of FIG. 11 is employed, the radio wave propagation situation in the space around the antenna can be estimated without interstice.

Though various examples of dividing the partial space have been described above, a conical form with a small error in volume from the circular cone is provided among the conical forms inscribed in the circular cone, with its central line being the path of the ray, whereby the space in the vicinity of the ray is made up of the conical form, and when the space in the vicinity of the ray is divided into plural partial spaces, employing plural similar conical forms for the conical form making up the space in the vicinity of the ray, the plural similar conical forms may be disposed in the vicinity of the ray so that there is a less error in volume between the conical form making up the space in the vicinity of the ray and the sum of plural similar conical forms that are analogous to the conical form and divided from this conical form.

As described above, according to the present invention, there is the effect of making it possible to increase the estimation precision and shorten the calculation time efficiently by adjusting the density of rays with the ray launching method more flexibly than with the conventional method. The reason will be as follows. Though the density of rays is adjusted uniformly in accordance with the propagation distance in the conventional method, the density of rays is increased till the degradation is judged to be small in the case where the density of rays is so small in reflection or transmission that the estimation precision is degraded in the present invention. Thereby, the increased calculation time due to generation of unnecessary rays can be suppressed so far as the estimation precision is not degraded.

What is claimed is:

1. A radio wave propagation characteristics estimation method of estimating radio wave propagation characteristics by detecting a shield shielding a ray (radio wave) among a plurality of objects,
    wherein said plurality of objects are provided in an observation area as defined in a three dimensional space, and said ray is radiated over said observation area, and
    a closed space confining said ray in a scene of said ray colliding with said shield is divided into a plurality of partial spaces, and a new ray confined by each of said plurality of partial spaces is generated.

2. A ray spatial resolution control method for use in estimating the radio wave propagation characteristics to adjust the spatial resolution of a ray (radio wave) in accordance with a certain criterion, when said ray collides with a shield shielding said ray among a plurality of objects, wherein the plurality of objects are provided in an observation area as defined in a three dimensional space, said ray is radiated over said observation area, and a space regarded as identical to said ray is provided in the vicinity of said ray, comprising:
    a first step of detecting a collision point of said ray with said shield;
    a second step of determining whether or not to divide said space regarded as identical to said ray in accordance with said certain criterion;
    a third step of dividing said space regarded as identical to said ray into a plurality of partial spaces if it is determined at said second step that said space regarded as identical to said ray is divided; and
    a fourth step of allotting a ray regarded as identical to each of said partial spaces divided at said third step.

3. The ray spatial resolution control method according to claim 2,
    wherein the number of divisions at said third step is set to M (M is an integer of 2 or greater), and after the ray is allotted to the i-th (i is a number from 1 to M) partial space at said fourth step, the first to fourth steps are executed for each of the allotted rays, whereby said first to fourth steps are repeated successively until it is determined that said space regarded as identical to the ray is not divided at said second step.

4. The ray spatial resolution control method according to claim 2,
    wherein said criterion at said second step consists of a first criterion for examining whether or not the field strength at a collision point of said ray with said shield is greater than or equal to a predetermined value, and a second criterion for examining whether or not an area ratio of a collided face of said shield to a cross section of said space in the vicinity of said ray taken by a plane containing said collided face of said shield is smaller than or equal to a predetermined value.

5. The ray spatial resolution control method according to claim 4,
    wherein said criterion at said second step further comprises a third criterion for examining whether or not the area of said cross section is greater than or equal to a predetermined value, and whether or not the angle (incident angle) of said ray with the normal to said collided face is greater than or equal to a predetermined value.

6. The ray spatial resolution control method according to claim 2,
    wherein a conical form inscribed in a circular cone, and having a small error in volume from said circular cone is provided, with a central line of said conical form being a path of said ray, whereby said space in the vicinity of said ray is made up of said conical form, wherein in dividing the space in the vicinity of said ray into a plurality of partial spaces at said third step, employing a plurality of similar conical forms for said conical form making up the space in the vicinity of said ray, said plurality of similar conical forms are disposed in the vicinity of said ray, so that there may be a small error in the volume between said conical form making up said space in the vicinity of said ray and the sum of said plurality of similar conical forms for said conical form dividing said conical form.

7. The ray spatial resolution control method according to claim 2,
    wherein at said third step, a triangular cone is employed as said conical form inscribed in a circular cone, and the size of said similar triangular cones is set so that a plurality of similar equal triangular cones for said triangular cone can be disposed inside said triangular cone without interstice.

8. The ray spatial resolution control method according to claim 2,
    wherein at said third step, a regular hexagonal cone is employed as said conical form inscribed in a circular cone, a similar regular hexagonal cone for said regular hexagonal cone is disposed at a center of said regular hexagonal cone, six regular hexagonal cones identical to said similar regular hexagonal cone are disposed on the side faces of said similar regular hexagonal cone, with one side face abutting with the other side face, and the size of said similar hexagonal cone is set so that an error in the volume between a total of seven similar regular hexagonal cones and said original regular hexagonal cone may be at minimum.

9. The ray spatial resolution control method according to claim 2, wherein at said third step, a regular hexagonal cone is employed as said conical form inscribed in a circular cone, a similar regular hexagonal cone for said regular hexagonal cone is disposed at a center of said regular hexagonal cone, six regular hexagonal cones identical to said similar regular hexagonal cone are disposed on the side faces of said similar regular hexagonal cone, with one side face abutting with the other side face, and the size of said similar hexagonal cones is set so that the outermost contour side face of a conical form composed of a sum of seven similar regular hexagonal cones may be inscribed in the side face of said original regular hexagonal cone to dispose said similar triangular cones.

10. The ray spatial resolution control method according to claim 2, wherein at said third step, a regular hexagonal cone is employed as said conical form inscribed in a circular cone, a similar regular hexagonal cone for said regular hexagonal cone is disposed at a center of said regular hexagonal cone, six regular hexagonal cones identical to said similar regular hexagonal cone are disposed on the side faces of said similar regular hexagonal cone, with one side face abutting with the other side face, and the size of said similar hexagonal cones is disposed and set so that said original regular hexagonal cone may be inscribed in the outermost contour side face of a conical form composed of a sum of seven similar regular hexagonal cones to dispose said similar triangular cones.

11. A radio wave propagation characteristics estimation system for estimating radio wave propagation characteristics by detecting a shield shielding a ray (radio wave) among a plurality of objects, wherein said plurality of objects are provided in an observation area as defined in a three dimensional space, and said ray is radiated over said observation area;

wherein a closed space confining said ray in a scene of said ray colliding with said shield is divided into a plurality of partial spaces, and a new ray confined by each of said plurality of partial spaces is generated.

12. A ray spatial resolution control system for use in estimating radio wave propagation characteristics to adjust the spatial resolution of a ray (radio wave) in accordance with a certain criterion, when said ray collides with a shield shielding said ray among a plurality of objects, wherein the plurality of objects are provided in an observation area as defined in a three dimensional space, said ray is radiated over said observation area, and a space regarded as identical to said ray is provided in the vicinity of said ray, comprising:

collision point detecting means for detecting a collision point of said ray with said shield;

determination means for determining whether or not to divide said space regarded as identical to said ray in accordance with said certain criterion;

division means for dividing said space regarded as identical to said ray into a plurality of partial spaces if said determination means determines that said space regarded as identical to said ray is divided; and allotting means for allotting a ray regarded as identical to each of said partial spaces divided by said division means.

13. The ray spatial resolution control system according to claim 12, wherein the number of divisions by said division means is set to M (M is an integer of 2 or greater), and after the ray is allotted to the i-th (i is a number from 1 to M) partial space by said allotting means, said collision point detecting means, said determination means, said division means and said allotting means are executed for each of the allotted rays, whereby said collision point detecting means, said determination means, said division means and said allotting means are executed repeatedly and successively until said determination means determines that said space regarded as identical to the ray is not divided.

14. The ray spatial resolution control system according to claim 12, wherein said criterion in said determination means consists of a first criterion for examining whether or not the field strength at a collision point of said ray with said shield is greater than or equal to a predetermined value, and a second criterion for examining whether or not an area ratio of a collided face of said shield to a cross section of said space in the vicinity of said ray taken by a plane containing said collided face of said shield is smaller than or equal to a predetermined value.

15. The ray spatial resolution control system according to claim 14, wherein said criterion in said determination means further comprises a third criterion for examining whether or not the area of said cross section is greater than or equal to a predetermined value, and whether or not the angle (incident angle) of said ray with the normal to said collided face is greater than or equal to a predetermined value.

16. The ray spatial resolution control system according to claim 12, wherein a conical form inscribed in a circular cone, and having a small error in volume from said circular cone is provided, with a central line of said conical form being a path of said ray, whereby said space in the vicinity of said ray is made up of said conical form, wherein when said division means divides the space in the vicinity of said ray into a plurality of partial spaces, employing a plurality of similar conical forms for said conical form making up the space in the vicinity of said ray, said plurality of similar conical forms are disposed in the vicinity of said ray, so that there may be a small error in the volume between said conical form making up said space in the vicinity of said ray and the sum of said plurality of similar conical forms for said conical form dividing said conical form.

17. The ray spatial resolution control system according to claim 12, wherein in said division means, a triangular cone is employed as said conical form inscribed in a circular cone, and the size of said similar triangular cones is set so that a plurality of similar equal triangular cones for said triangular cone can be disposed inside said triangular cone without interstice.

18. The ray spatial resolution control system according to claim 12, wherein in said division means, a regular hexagonal cone is employed as said conical form inscribed in a circular cone, a similar regular hexagonal cone for said regular hexagonal cone is disposed at a center of said regular hexagonal cone, six regular hexagonal cones identical to said similar regular hexagonal cone are disposed on the side faces of said similar regular hexagonal cone, with one side face abutting with the other side face, and the size of said similar hexagonal cones is set so that an error in the volume between a total of seven similar regular hexagonal cones and said original regular hexagonal cone may be at minimum.

19. The ray spatial resolution control system according to claim 12, wherein in said division means, a regular hexagonal cone is employed as said conical form inscribed in a circular cone, a similar regular hexagonal cone for said regular hexagonal cone is disposed at a center of said regular hexagonal cone, six regular hexagonal cones identical to said similar regular hexagonal cone are disposed on the side faces of said similar regular hexagonal cone, with one side face abutting with the other side face, and the size of said similar hexagonal cones disposed is set so that the outermost contour side face of a conical form composed of a sum of seven similar regular hexagonal cones may be inscribed in the side face of said original regular hexagonal cone.

20. The ray spatial resolution control system according to claim 12, wherein in said division means, a regular hexagonal cone is employed as said conical form inscribed in a circular cone, a similar regular hexagonal cone for said regular hexagonal cone is disposed at a center of said regular hexagonal cone, six regular hexagonal cones identical to said similar regular hexagonal cone are disposed on the side faces of said similar regular hexagonal cone, with one side face abutting with the other side face, and the size of said similar hexagonal cones disposed is set so that said original regular hexagonal cone may be inscribed in the outermost contour side face of a conical form composed of a sum of seven similar regular hexagonal cones.

21. A program for enabling a computer to perform a radio wave propagation characteristics estimation method of estimating the radio wave propagation characteristics by detecting a shield shielding a ray (radio wave) among a plurality of objects, wherein said plurality of objects are provided in an observation area as defined in a three dimensional space, and said ray is radiated over said observation area, and wherein a closed space confining said ray in a scene of said ray colliding with said shield is divided into a plurality of partial spaces, and a new ray confined by each of said plurality of partial spaces is generated.

22. A program for enabling a computer to perform a ray spatial resolution control method for use in estimating radio wave propagation characteristics to adjust a spatial resolution of a ray (radio wave) in accordance with a certain criterion, when said ray collides with a shield shielding said ray among a plurality of objects, wherein the plurality of objects are provided in an observation area as defined in a three dimensional space, said ray is radiated over said observation area, and a space regarded as identical to said ray is provided in the vicinity of said ray, comprising:

a first step of detecting a collision point of said ray with said shield;

a second step of determining whether or not to divide said space regarded as identical to said ray in accordance with said certain criterion;

a third step of dividing said space regarded as identical to said ray into a plurality of partial spaces if it is determined at said second step that said space regarded as identical to said ray is divided; and a fourth step of allotting a ray regarded as identical to each of said partial spaces divided at said third step.

23. The program according to claim 22, wherein the number of divisions at said third step is set to M (M is an integer of 2 or greater), and after the ray is allotted to the i-th (i is a number from 1 to M) partial space at said fourth step, the first to fourth steps are executed for each of the allotted rays, whereby said first to fourth steps are repeated successively until it is determined that said space regarded as identical to the ray is not divided at said second step.

* * * * *